United States Patent [19]

Goel

[11] Patent Number: 4,737,564

[45] Date of Patent: Apr. 12, 1988

[54] POLYPHENATE SALTS OF TRIETHYLENE DIAMINE AND THEIR USE IN POLYMERIZING A POLYISOCYANATE AND A POLYEPOXIDE

[75] Inventor: Anil B. Goel, Worthington, Ohio

[73] Assignee: Ashland Oil, Inc., Ashland, Ky.

[21] Appl. No.: 66,386

[22] Filed: Jun. 25, 1987

[51] Int. Cl.$^4$ .................. C08G 18/08; C08G 18/20; C08G 18/28

[52] U.S. Cl. .......................... 528/54; 528/73

[58] Field of Search .................... 528/54, 73

[56] References Cited

U.S. PATENT DOCUMENTS 3,673,128 7/1972 Hayash, Jr. et al. .............. 528/54
4,564,651 1/1986 Markert et al. .................. 528/54

FOREIGN PATENT DOCUMENTS 2551631 5/1976 Fed. Rep. of Germany .

Primary Examiner—Harold D. Anderson
Assistant Examiner—Dennis R. Daley
Attorney, Agent, or Firm—John F. Jones

[57] ABSTRACT

A process for preparing polymeric compositions which may be used in applications such as reaction injection molding (RIM), composites, adhesives, coatings, tooling compounds and the like which comprises the polymerization of a mixture of a polyisocyanate and a polyepoxide in the presence of a catalytic amount of a polyphenate salt of triethylene diamine at a temperature in the range of from about ambient temperature to about 150° C. is described.

5 Claims, No Drawings

POLYPHENATE SALTS OF TRIETHYLENE DIAMINE AND THEIR USE IN POLYMERIZING A POLYISOCYANATE AND A POLYEPOXIDE

This invention relates to rapid curing theromset polymeric compositions having excellent physical properties which are obtained by the interpolymerization of polyisocyanates and polyepoxides in the presence of a polyphenate salt of triethylene diamine (DABCO). The compositions embodied in this invention can also contain polyols and polyphenolic additives in the polymerization mixture used to produce them.

A variety of tertiary amine and metal salts have been used as catalysts in the homopolymerization and copolymerization of polyisocyanates with polyols, polyamines and epoxy resins. The use of solid, non-corrosive polyphenate salts of DABCO with polyphenolic compounds such as Bisphenol-A to give rapid curing polymers has not heretofore been disclosed. The polymeric compositions of this invention exhibit excellent strengths, modulus and heat distortion temperatures and may be used in applications such as reaction injection molding (RIM), composites, adhesives, coatings, tooling compounds and the like.

It is well known to homopolymerize and copolymerize polyisocyanates with polyols and polyamines and also with polyepoxides. It is also well known that the copolymerization reactions of polyisocyanates are influenced by the type of catalyst used to promote the polymerization rate. A variety of tertiary amines, quaternary salts and metal salts have been used as catalysts which influence the rate of polymerization and control the type and the performance of the polymers obtained. See, for instance, "Advances in Urethane Science and Technology," Vol. 2, 1971 edited by K. C. Firsch and S. L. Reegan.

Thermoset polymers containing isocyanurate groups and oxazolidone groups obtained by the trimerization reaction of polyisocyanates and copolymerization reactions of an isocyanate compound with epoxy compound, respectively, have been reported to have higher thermal stability compared with that of polyurethane groups thermoset polymers obtained by the copolymerization of polyisocyanates with polyols. Many catalysts have been described in the prior art for the trimerization of polyisocyanates and also for the copolymerization of polyisocyanates with epoxy resins, including tetraalkyl ammonium salts and Lewis acid amine salts such as boron trifluoride/amine complexes.

Most of the Lewis acid catalysts used for copolymerization of polyisocyanates and polyepoxides are corrosive and difficult to handle. Various other catalysts either catalyze the polymerization at slow rate, requiring long reaction time and postcuring of the polymer, or the resulting polymers do not exhibit good physical performance. For instance, Ger. Offen. DE No. 3,323,123 describes the use of boron trichloride/benzyl amine catalyst in the copolymerization of isocyanate and epoxy resins requiring postcuring for four hours at 140° C. and 16 hours at 200° C.

Similarly, U.S. Pat. Nos. 3,242,108; 4,022,721 and 4,224,422 describe the use of Lewis acid catalysts for the copolymerization of polyisocyanates with polyepoxides. U.S. Pat. No. 4,386,191 describes the use of tetraalkyl ammonium salts as catalysts for the copolymerization of polyisocyanate and epoxy groups requiring postcuring at 120° C. overnight to obtain reasonable physical properties.

I have discovered that the mixtures of polyisocyanate and polyepoxide resins will cure rapidly at ambient temperatures to moderately elevated temperatures (no greater than 150° C.), in the presence of small amounts of stable powdered polyphenate salts of triethylene diamine (DABCO, also called diazabicyclooctane), with polyphenolic compounds such as Bisphenol-A, resorcinol, biphenols, Bisphenol-F, 2,2'-sulfonyl bisphenol, dihydroxynaphthalene, oxy and thiobisphenols, phenol formaldehyde condensation product such as resols and novolacs and the like to give rapid curing thermoset polymers having excellent physical properties such as high heat distortion temperatures, tensile strengths and modulus. The catalysts of this invention are stable, free-flowing powders having low hygroscopicity and corrosivity and they catalyze the homopolymerization of both polyisocyanates and epoxide resins. The trimerization of polyisocyanate is also catalyzed by these catalysts in the presence of small amounts of polyepoxide.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1, 2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two more fully disclosed in U.S. Pat. Nos. 3,350,362 and 3,382,215. Polyisocyanates which are polymeric in nature including isocyanate prepolymers of all types are included in this invention.

Polyepoxides useful in this invention include those disclosed in U.S. Pat. Nos. 2,500,600 and 2,324,483 which are incorporated herein by reference. Preferred in this invention are 1,2-epoxy compounds having an epoxide equivalence greater than 1, that is to say, compounds containing more than one group of the formula:

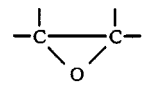

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

Polyepoxides containing an inner 1,2-epoxy group include epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl-9,10,12,13-diepoxy stearate or the dimethyl ester of 6,7,10,11-diepoxyhexadecane-1,16-dicarboxylic acid. Furthermore, there may be mentioned epoxidized mono-, di-, or polyesters and mono-, di-, or polyacetals containing at least one cycloaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxy octane, and the like with either a polyhydric phenol or a polyhydric alcohol.

The amount of polyepoxide resin to polyisocyanate used in the polymerization mixtures of this invention may be in amounts ranging from 1–60% by weight, and preferably, in the range of 5–40% by weight, respectively, of the total mixture. The catalyst, which is the DABCO/polyphenolic compound salt, may be used in amounts ranging from about 0.1 to about 8% by weight and preferably from about 0.5 to about 5% by weight of the total polymerization mixture.

The polymerizable compositions of this invention may contain in addition to the required polyepoxide resin, polyisocyanate and DABCO/polyphenolic salt, optionally reactive additives such as polyols and polyamines which can be added for certain advantages such as improved impact strength and flexibility when these properties are desired. When such additives are used they should be used in such proportions that the amount of active hydrogen in the additive will always be less than the equivalent of the amount of isocyanate functionality present in the polymerization mixture.

Other additives such as plasticizers, reinforcing fibers and fillers, pigments, and the like may be used in the compositions of this invention.

The thermosetting compositions of this invention may be used in applications such as coatings, structural adhesives, molding compositions, composites, RIM, foams, tooling compositions, potting compounds and the like.

This invention is further illustrated in the following representative examples.

EXAMPLE 1

To 40 g of liquid methylene bis(phenyl isocyanate) having a functionality of 2.1 NCO per mole and an NCO equivalent weight of 144 was dispersed 1.6 g of powdered triethylene diamine/Bisphenol-A salt having particle size smaller than 100 mesh (prepared by reacting a solution in diethyl ether of Bisphenol-A with DABCO in 1:1 molar ratio), and the mixture was then degassed on a rotary evaporator under reduced pressure. The resulting material was mixed rapidly with a degassed solution of 30 g of the liquid methylene bis(phenyl isocyanate) and 30 g of liquid diglycidyl ether of Bisphenol-A (epoxy equivalent weight of 180 to 190) and the resulting mixture was then poured into a mold prepared by using two parallel silicone mold release coated glass plates held apart with ⅛" thick spacers and the mold and contents were kept warm at 100° C. A rapid polymerization occurred in the mold within fifteen seconds to give an infusible thermoset polymer which was postcured for 15 minutes at 130° C. The resulting polymer was hard and had a heat distortion temperature (ASTM D 648) of 145° C., notched izod impact strength (ASTM D 256) of 0.2 foot pounds per inch of notch, flexural strength (ASTM D 790) of 20,800 psi and flexural modulus of 575,000 psi.

EXAMPLE 2

The procedure of Example 1 was followed using 41.6 g of the mixture of the liquid methylene bis(phenyl isocyanate) of Example 1 containing 1.6 g of powdered DABCO/Bisphenol-A catalyst and mixing this with a solution of 30 g of methylene bis(phenyl isocyanate) and 30 g of the diglycidyl ether of poly(propylene ether) glycol (epoxy equivalent weight of 175 to 205). The resulting molded polymer was found to have a notched izod impact strength of 0.2 foot pounds per inch of notch, heat distortion temperature of 255° C., flexural strength of 16,787 psi and flexural modulus of 434,792 psi.

EXAMPLE 3

The procedure of Example 1 was followed using 70 g of liquid methylene bis(phenyl isocyanate), 30 g of the 60:40 (weight) adduct of the liquid diglycidyl ether of Bisphenol-A/carboxyl-terminated butadiene-acrylonitrile (18% acrylonitrile) Hycar rubber (BF Goodrich 1300×8 CTBN), and 1.6 g of the DABCO/Bisphenol-A catalyst. The resulting polymer formed within a few seconds after the polymerization mixture was poured into the mold and it was post cured for 15 minutes at 130°. The final polymer product was found to have a notched izod impact strength of 0.4 foot pounds per inch of notch, an unnotched izod impact strength of 3 foot pounds per inch, heat distortion temperature of 152° C., flexural strength of 17,262 psi and flexural modulus of 401,950 psi.

EXAMPLE 4

The DABCO/Bisphenol-A catalyst described in Example 1 (1.0 g) was dispersed in 30 g of poly(alkylene oxide) tetraol (hydroxy equivalent weight of 113) and the mixture was degassed. The resulting mixture was blended rapidly with a degassed solution of 80 g of liquid methylene bis(phenyl isocyanate) and 30 g of the diepoxide resin described in Example 2. A small amount of the resulting solution was applied to a zinc phosphatized steel plate in the form of 1–2 mils thick coating and the remaining portion of the mixture was poured rapidly into the glass sheet mold described in Example 1. The polymer in the mold was cured as in Example 1. The resulting polymer was found to have a notched izod impact strength of 0.4 foot pounds per inch of notch, unnotched izod impact strength of 3.5 foot pounds per inch, heat distortion temperature of 86° C., flexural strength of 16,700 psi and flexural modulus of 404,100 psi. The coating on the steel plate after curing at 110° C. for 10 minutes was tested for adhesion using the Tape Adhesion Test Method (ASTM D 3359) and it showed 100% adhesion. The pencil hardness (ASTM D 3363) of the coating was 3 H and reverse impact (ASTM D 2794) of greater than 100 in/lbs. The coating also passed the methyl ethyl ketone (MEK) rubbing test (greater than 100 rubs).

EXAMPLE 5

The procedure of Example 4 was followed using 30.8 g of the diepoxide of Example 2, 80 g of liquid methylene bis(phenyl isocyanate) and 1.1 g of the DABCO/-Bisphenol-A catalyst. The resulting polymer had a notched izod impact strength of 0.5 foot pounds per inch of notch, an unnotched impact strength of 4.4 foot pounds per inch, heat distortion temperature of 87° C., flexural strength of 11,730 psi and flexural modulus of 254,000 psi. The coating applied to the zinc phosphatized steel plate was found to have a pencil hardness of 1 H, showed 100% adhesion and passed the MEK rubbing test of 100 rubs.

EXAMPLE 6

This is a comparative Example which is outside the scope of the present invention and demonstrates that use of a standard tertiary amine catalyst promoted (activated) with a small amount of epoxy resin results in homopolymerization of polyisocyanate, with the inferior physical properties of the polymer. The procedures of Examples 1, 3 and 4 were followed using 60 g of the liquid methylene bis(phenyl isocyanate) of Example 1, 1.25 g of the diepoxide of Example 2 and 0.6 g of triethylene diamine catalyst. The resulting polymer was extremely brittle, showing unnotched izod impact strength of 0.1 foot pounds per inch and the reverse impact on the coating on steel (failed below 50 in./lbs. of impact.

I claim:

1. The process comprising polymerization of a mixture of a polyisocyanate and a polyepoxide in the presence of a catalytic amount of a salt of triethylene diamine and a member selected from the group consisting of Bisphenol-A, recorcinal, biphenols, Bisphenol-F, 2,2'sulfonyl bisphenol, dihydroxynaphthalene, oxy and thiobisphenols and formaldehyde condensation products at a temperature in the range of from about ambient temperature to about 150° C.

2. The process of claim 1 wherein the polyepoxide is present in from 1–60% by weight of the mixture.

3. The process of claim 2 wherein the polyphenate salt is present in from about 0.1 to 8% by weight of the mixture.

4. The process of claim 3 wherein the polyisocyanate is methylene bis(phenyl isocyanate), the polyepoxide is the diglycidyl ether of Bisphenol-A and the polyphenate salt is the reaction product of triethylene diamine and Bisphenol-A.

5. The process of claim 3 wherein the polyisocyanate is methylene bis(phenyl isocyanate), the polyepoxide is the diglycidyl ether of poly(propylene ether) glycol and the polyphenate salt is the reaction product of triethylene diamine and Bisphenol-A.

* * * * *